(12) United States Patent
Driscoll (10) Patent No.: US 6,804,354 B1
(45) Date of Patent: Oct. 12, 2004

(54) CRYPTOGRAPHIC ISOLATOR USING MULTIPLICATION

(75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/453,263

(22) Filed: Dec. 2, 1999

(51) Int. Cl.[7] .............................. H04L 9/00; H04K 1/00; G06F 7/38; G06F 7/52
(52) U.S. Cl. .................... 380/28; 380/45; 708/497; 708/607; 708/630; 713/176
(58) Field of Search ................. 713/176; 380/28, 380/45, 46; 708/497, 607, 630

(56) References Cited

U.S. PATENT DOCUMENTS

| | | | | |
|---|---|---|---|---|
| 4,202,051 A | * | 5/1980 | Davida et al. | 380/46 |
| 5,262,976 A | * | 11/1993 | Young et al. | 708/628 |
| 5,307,409 A | | 4/1994 | Driscoll | 380/2 |
| 5,461,674 A | * | 10/1995 | Citta | 380/201 |

OTHER PUBLICATIONS

Marsaglia, George, "Multiple–With–Carry (MWC) Generators," *Marsaglia's Diehard CD–ROM, available online at ftp.csis.hku.hk.com*, pp. 35–38 (1994).

Zeng, Kencheng et al., "Pseudorandom Bit Generators in Stream–Cipher Cryptography," IEEE Computer, pp. 8–17, (Feb. 1991).

Block Cipher Code Employing Modular Multiplication Designed by Joan Daemen with Public Domain Implementation MMB20 by Paulo Barreto pbarreto@uninet.com.br (16 pgs.).

* cited by examiner

Primary Examiner—Gilberto Barrón
Assistant Examiner—Cas Stulberger
(74) Attorney, Agent, or Firm—Kris T. Fredrick (57) ABSTRACT

A stream cipher cryptosystem includes a pseudo-random bit generator receiving a key and providing a vulnerable keystream vulnerable to crytanalysis, and a non-linear filter cryptographic isolator to convert the vulnerable keystream into a protected keystream. The non-linear filter cryptographic isolator includes a multiplier for performing a multiplication function on the vulnerable keystream to provide a lower partial product array and an upper partial product array, and a simple unbiased operation (SUO) for combining the lower partial product array and the upper partial product array to provide the protected keystream. In example encryption operations, a plaintext binary data sequence is combined with the protected keystream to provide a ciphertext binary data sequence. In example decryption operations, a ciphertext binary data sequence is combined with the protected keystream to provide a plaintext binary data sequence.

52 Claims, 4 Drawing Sheets

CRYPTOGRAPHIC ISOLATOR USING MULTIPLICATION

THE FIELD OF THE INVENTION

The present invention generally relates to cryptosystems, and more particularly relates to private-key stream cipher cryptosystems which employ at least one pseudo-random number generator (PRNG) and post-processing cryptographic isolator to obscure the PRNG state. The combination of PRNG and isolator produces pseudo-random bit keystreams for combining with plaintext to encrypt the plaintext into ciphertext and for combining with the ciphertext to decipher the ciphertext into plaintext.

BACKGROUND OF THE INVENTION

Cryptosystems perform cryptography to transform plaintext into ciphertext so that only an authorized receiver can transform the ciphertext back into the original plaintext. Encryption or enciphering is the process that transforms plaintext into ciphertext. Decryption or deciphering is the process that transforms ciphertext into plaintext.

A parameter called an encryption key is employed by a cryptosystem to prevent the plaintext from being easily revealed by an unauthorized person. A sender transforms a given plaintext into a large variety of possible ciphertext selected by the specific encryption key. A receiver of the ciphertext deciphers the ciphertext by employing a parameter referred to as a decryption key. In a publickey cryptosystem, the encryption key is made public while the decryption key is kept secret. Therefore, in public key cryptosystems, the decryption key must be computationally infeasible to deduce from the encryption key. In a private-key cryptosystem, the sender and the receiver typically share a common key that is used for both enciphering and deciphering. In such a private-key cryptosystem, the common key is alterable and must be kept secret.

Private-key cryptosystems are typically implemented as block cipher cryptosystems or stream cipher cryptosystems. Block cipher cryptosystems divide the plaintext into blocks and encipher each block independently using a stateless transform. In block cipher cryptosystems if one fixed common private-key is employed to encipher different occurrences of a particular plaintext block, all of these occurrences are encrypted into identical corresponding ciphertext blocks. Therefore, the block size is preferably selected to be large enough to frustrate attacks from a crytanalysis, which analyzes the occurrence frequencies of various patterns among the ciphertext blocks. Example block sizes are 64 bits and 128 bits.

In stream cipher cryptosystems, the plaintext is typically encrypted on a bit-by-bit or word-by-word basis using a stateful transform that evolves as the encryption progresses. In encrypting the plaintext binary data sequence for transmission as a ciphertext binary data sequence, the common private-key is a parameter which controls a pseudo-random number generator (PRNG) to create a long sequence of binary data referred to as a keystream. The stream cipher cryptosystem includes a cryptographic combiner, which combines the keystream with the plaintext sequence. The cryptographic combiner is typically implemented with exclusive-or (XOR) bit-wise logic gates, which perform bit-wise modulo-2 addition. The cryptographic combiner produces the ciphertext. At the receiver, the common private-key controls a receiver PRNG to produce a decryption keystream. The decryption keystream is combined with a decryption combiner to decrypt the ciphertext to provide the plaintext to the receiver. The receiver decryption combiner operation must be the inverse of the sender encryption combiner operation. For this reason, the most common combiner operation is bit-wise XOR which is its own inverse.

One problem with stream cipher cryptosystems is the difficulty of generating a long, statistically uniform, and unpredictable sequence of binary data in the keystream from a short and random key. Such sequences are desirable in the keystream in cryptography to make it impossible, given a reasonable segment of its data and sufficient computer resources, to find out more about the sequences.

There are three general requirements for cryptographically secure keystream PRNGs. First, the period of a keystream must be large enough to accommodate the length of the transmitted message. Second, the keystream output bits must be easy to generate. Third, the keystream output bits must be hard to predict. For example, given the PRNG and the first N output bits, $a(0), a(1), \ldots, a(N-1)$, it should be computationally infeasible to predict the $(N+1)^{th}$ bit $a(N)$ in a sequence with better than a 50—50 chance. In otherwords, a cryptanalyst should not be able to generate other forward bits or backward bits if presented with a given portion of the keystream output sequence.

The PRNG employed in stream cipher cryptosystems, often employs a feedback shift register (FSR) which includes N storage elements and a feedback function that expresses each new element $a(t)$ of the sequence, in terms of the previous generated elements $a(t-N), a(t-N+1), \ldots, a(t-1)$. Each individual storage element of the FSR is called a stage, and the binary signals $a(0), a(1), a(2), \ldots, a(N-1)$ are loaded into the stages as initial data to generate the Keystream sequence. The period of the keystream sequence produced by the FSR depends both on the number of stages and on the details of the feedback function. The maximal period of a keystream sequence generated by an N-stage FSR with a non-singular feedback function is $2^N$, which represents the number of possible states of the N-stage FSR.

Depending on whether the feedback function is linear or is non-linear, the FSR is referred to respectively as a linear feedback shift register (LFSR) or a non-linear feedback shift register (NLFSR).

In particular, the LFSR is employed in many PRNGs for stream cipher cryptosystems. The LFSR feedback function is of the form $a(t) = c_1 a(t-1)$ XOR $c_2 a(t-2)$ XOR ... XOR $c_{N-1} a(t-N+1)$ XOR $a(t-N)$, where $c_j$ is an element of the set $\{0,1\}$. The feedback function of an LFSR can be represented formally by what is referred to as a feedback polynomial:

$$f(x) = 1 + c_1 x + c_2 x^{N-2} + \ldots + c_{N-1} x^{N-1} + x^N$$

where the intermediate x has no other meaning than as a mathematical symbol. This feedback polynomial decides the period and the statistical behavior of the keystream output sequence. To avoid trivial output, the zero-state should be excluded from the initial setting. This limits the largest possible period of an LFSR to $2^N - 1$.

In general, to generate the largest possible period $2^N - 1$ for the output sequence, the feedback polynomial $f(x)$ of the LFSR should be primitive. A sequence generated by an LFSR with a primitive feedback polynomial is referred to as a maximal-length LFSR sequence or simply an m-sequence. However, m-sequences cannot be used as keystreams without undergoing further cryptographic transformation. Without this further cryptographic transformation, the key of secrecy (i.e., the initial state of the LFSR and the feedback function of the LFSR) of an N-stage LFSR can be determined from just 2N successive bits of the output sequence.

Efficient synthesis procedures exist for finding feedback polynomials of the shortest LFSR that would generate a given output sequence. The length of such an LFSR is referred to as the linear complexity of the sequence. As a result, an LFSR suitable for employment in a cryptosystem, must guarantee a large enough key independent lower bound to the linear complexity of the sequences the LFSR generates.

The "known plaintext" cryptanalysis attack combines known or guessed plaintext with ciphertext to recover the keystream. Recovering 2N bits destroys the secrecy of an LFSR. Therefore, maximal-length LFSR output sequences cannot be used as keystreams without undergoing further cryptographic transformation. A common method for providing this further cryptographic transformation is to add cryptographic isolators, which provide post-processing of the output of an LFSR. Other methods of cryptographic transformation include non-linear combining of the plaintext and keystream, non-linear combining of multiple LFSRs, and clock control of the LFSR(s). In particular, the cryptographic isolator provides security against certain types of attacks by cryptanalysis. The cryptographic isolator is typically implemented as a non-linear filter. The non-linear filter combines some output bits of the LFSR with some other LFSR output bits, previous plaintext, ciphertext, or other data using a non-linear function to provide the keystream to the cryptographic combiner. The non-linear filter is a one-way function to provide further security in the keystream by making it computationally very expensive for a cryptanalyst to attempt to go backwards or preferably by making it impossible to go backwards to determine the inputs of the cryptographic isolator based on the outputs of the cryptographic isolator.

Conventional cryptographic one-way functions are typically very complex and quite slow for various reasons. Cryptosystems typically require cryptographic isolators to have length preservation. Length preservation means that the number of output bits from the cryptographic isolator are equal to the number of input bits into the cryptographic isolator.

Cryptosystems also typically require that the cryptographic isolator one-way function add little or no bias to the output of the cryptographic isolator. No bias in the output of the cryptographic isolator means that if the input to the cryptographic isolator is uniformly distributed, the output is or is nearly uniformly distributed.

Another desirable property for the cryptographic isolator one-way function is diffusion or avalanche. The diffusion or avalanche property requires that each output bit from the cryptographic isolator one-way function be a function of every input bit to the cryptographic isolator. Conventional cryptographic isolators which achieve length preservation, add little or no bias to the output bits, and further provide full or nearly full diffusion are very complex to implement, and as a result, are quite expensive in terms of hardware resources or software execution time, and produce output bits at a very slow rate.

For reasons stated above and for other reasons presented in greater detail in the Description of the Preferred Embodiments section of the present specification, a stream cipher cryptosystem is desired which includes a PRNG cryptographic isolator to produce pseudo-random bit keystreams with length; preservation, little bias, and full or nearly full diffusion, where the cryptographic isolator is not as complex as conventional cryptographic isolators and operates at a faster rate than conventional cryptographic isolators.

SUMMARY OF THE INVENTION

The present invention provides a stream cipher cryptosystem including a pseudo-random number generator (PRNG) receiving a key and providing a vulnerable keystream, and a non-linear filter cryptographic isolator to convert the vulnerable keystream into a protected keystream. The non-linear filter cryptographic isolator includes a multiplier for performing a multiplication function on the PRNG vulnerable keystream to provide a partial product array having a lower partial product array and an upper partial product array, and a simple unbiased operation (SUO) for combining the lower partial product array and the upper partial product array to provide the protected keystream. The combination of the multiplication function and the SUO is a one-way function.

In one embodiment, the pseudo-random bit generator includes a linear feedback shift register (LFSR) responsive to the key for providing the vulnerable keystream.

In one embodiment, the stream cipher cryptosystem includes a cryptographic combiner for combining a first binary data sequence and the protected keystream to provide a second binary data sequence.

In encryption operations, the cryptographic combiner is an encryption combiner and the first binary data sequence is a plaintext binary data sequence and the second binary data sequence is a ciphertext binary data sequence. In decryption operations, the cryptographic combiner is a decryption combiner and the first binary data sequence is a ciphertext binary data sequence and the second binary data sequence is a plaintext binary data sequence.

In one embodiment, the non-linear filter cryptographic isolator also includes a state function for providing a state value to the multiplier which multiplies the vulnerable keystream and the state value to provide the partial product array.

In one embodiment, the SUO is one of the commonly available dyadic operations (i.e., an operation performing a function on exactly two inputs), such as addition, subtraction, exclusive-or, or exclusive-nor, which combines two same sized inputs into an output that is also the same size in manner that does not add any bias (i.e., if the inputs are uniformly distributed, the output is uniformly distributed). In one embodiment, the SUO is performed with a look-up table. The combination of the multiplier operation and the SUO is not an invertible function. In one embodiment, the non-linear filter cryptographic isolator selects the SUO from various SUOs, such as an addition operation, a subtraction operation, an exclusive-or operation, and exclusive-nor operation after each multiply. In one embodiment, the selection is pseudo-random. In one embodiment, the selection is deterministic.

The combination of multiply and SUO produces only a small bias except for one output value which can be up to three times more frequent than the mean output frequency. This value is produced whenever one of the inputs is zero. The value produced depends on the SUO, e.g., exclusive-or produces a: zero while exclusive-nor produces a bit vector of all one's. In one embodiment, the non-linear filter cryptographic isolator tests the keystream for an output that is more likely to occur, and when found, the non-linear filter cryptographic isolator replaces the output that is more likely to occur with an unbiased value such, as the input or some function of the input.

In one embodiment, a state function receives PRNG output data and combines the previous state value with the PRNG output data using one's complement addition to provide the next state value. The state value is used as an input to the multiply. In one embodiment, an initialization vector is provided to the state function to initialize the state value to a non-zero value, which remains nonzero because of the use of the one's complement operation. In one embodiment, both inputs to the multiply are non-zero initialized one's complement running sums.

In one embodiment, a state function receives the partial product array and performs a function on the partial product array to provide the state value. In one embodiment, the non-linear filter cryptographic isolator divides PRNG output data into a first portion and a second portion and the multiplication function includes multiplying the first portion and the second portion.

The stream cipher cryptosystem according to the present invention includes the non-linear filter cryptographic isolator having the multiplication function, which produces pseudo-random bit keystreams with little bias, full diffusion, and optionally with length preservation. Moreover, the non-linear filter cryptographic isolator having the multiplication function according to the present invention is not as complex as conventional cryptographic isolators and operates at a faster rate than conventional cryptographic isolators of comparable security.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
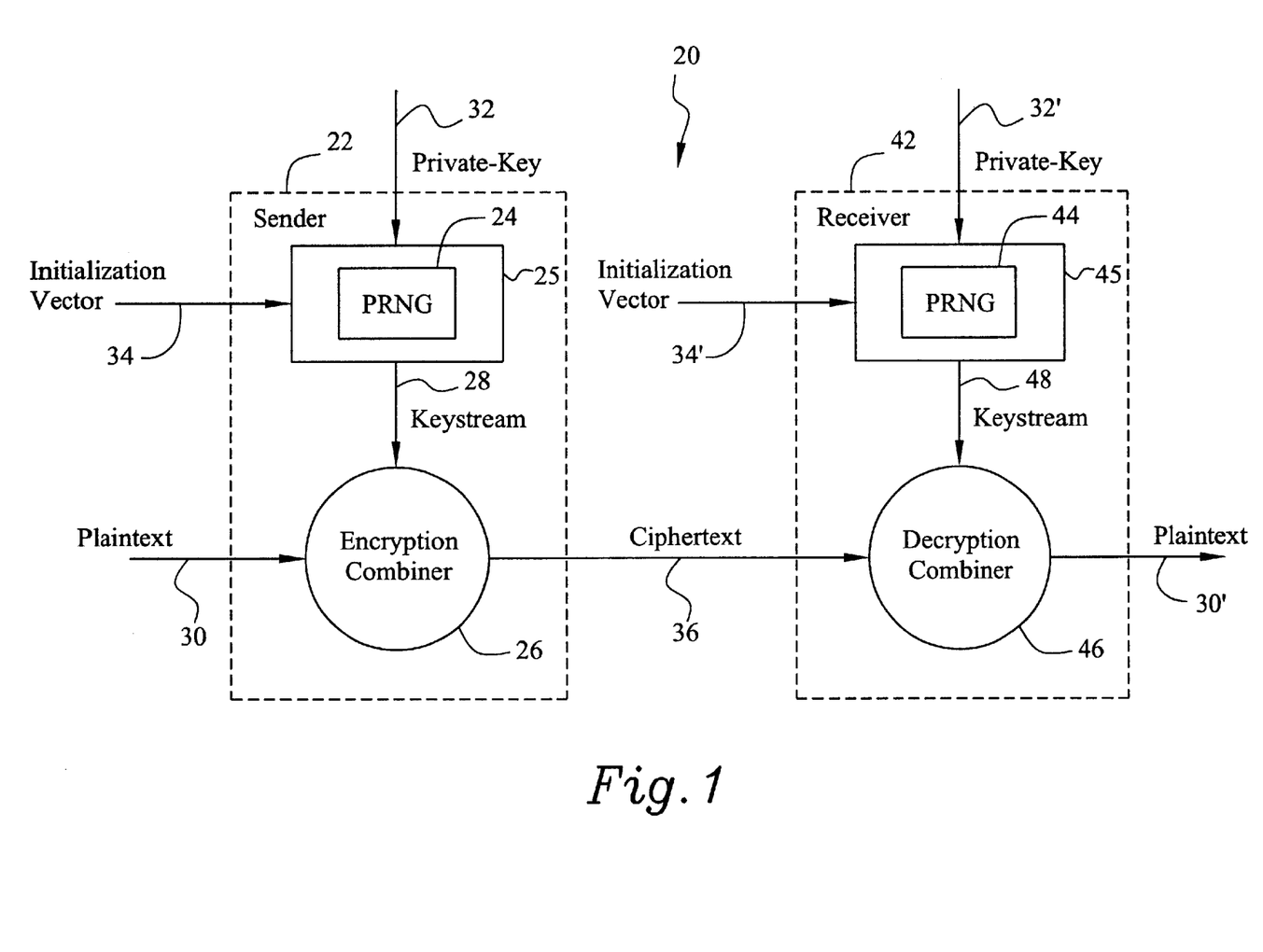
FIG. 1 is a block diagram of a private-key stream cipher cryptosystem according to the present invention.

A private-key stream cipher cryptosystem according to the present invention is illustrated generally at 20 in FIG. 1 in block diagram form. Stream cipher cryptosystem 20 includes a sender 22, such as a computer system, and a receiver 42, such as a computer system.

Sender 22 includes a protected keystream generator 25 and an encryption combiner 26. Protected keystream generator 25 includes a pseudo-random number generator (PRNG) 24. Protected keystream generator 25 receives a private-key 32, which controls protected keystream generator 25 to produce an encryption protected keystream 28 to be provided to encryption combiner 26. In the embodiment illustrated in FIG. 1, an initialization vector 34 is also provided to protected keystream generator 25 to ensure that encryption protected keystream 28 is not the same, even if the same private-key 32 is used to control protected keystream generator 25 for multiple messages. Initialization vector 34 can be embodied as a true random number to ensure that every message which is encrypted is slightly different.

Plaintext 30 is also provided to encryption combiner 26. Plaintext 30 is a binary data sequence. Encryption combiner 26 combines plaintext 30 and encryption protected keystream 28 to form ciphertext 36, which is also a binary data sequence. In one embodiment, encryption combiner 26 is implemented with exclusive-or (XOR) bit-wise logic gates, which perform bit-wise module-2 addition.

Receiver 42 includes protected keystream generator 45 and decryption combiner 46. Protected keystream generator 45 includes a PRNG 44. Protected keystream generator 45 receives private-key 32', which is the same private-key as the private-key 32. Protected keystream generator 45 is controlled by private-key 32' to produce decryption protected keystream 48, which is provided to decryption combiner 46. In the embodiment illustrated in FIG. 1, an initialization vector 34' which is the same initialization vector as initialization vector 34 is provided to protected keystream generator 45 to ensure that decryption protected keystream 48 is identical to encryption protected keystream 28 for a given private-key 32/32' and initialization vector 34/34'.

Decryption combiner 46 receives ciphertext 36 and combines ciphertext 36 with decryption protected keystream 48 to produce plaintext 30', which is a binary data sequence that substantially matches plaintext 30. Decryption combiner 46 must have a combiner operation which is the inverse of the combiner operation of encryption combiner 26 so that encryption protected keystream 28 can be used to encrypt plaintext 30 to form ciphertext 36 and decryption protected keystream 48, which is identical to encryption protected keystream 28, can be used to decrypt ciphertext 36 to form plaintext 30'. For this reason, the most common cryptographic combiner operation is bit-wise XOR, which can be used for both the encryption and decryption combiner operations.

As mentioned in the Background of the Invention section of the present specification, PRNGs 24 and 44 should have the following general characteristics to produce cryptographically secure keystreams 28 and 48. First, the period of a keystream must be large enough to accommodate the length of the transmitted message. Second, the keystream output bits must be easy to generate. Third, the keystream output bits must be hard to predict.

Figure 2:
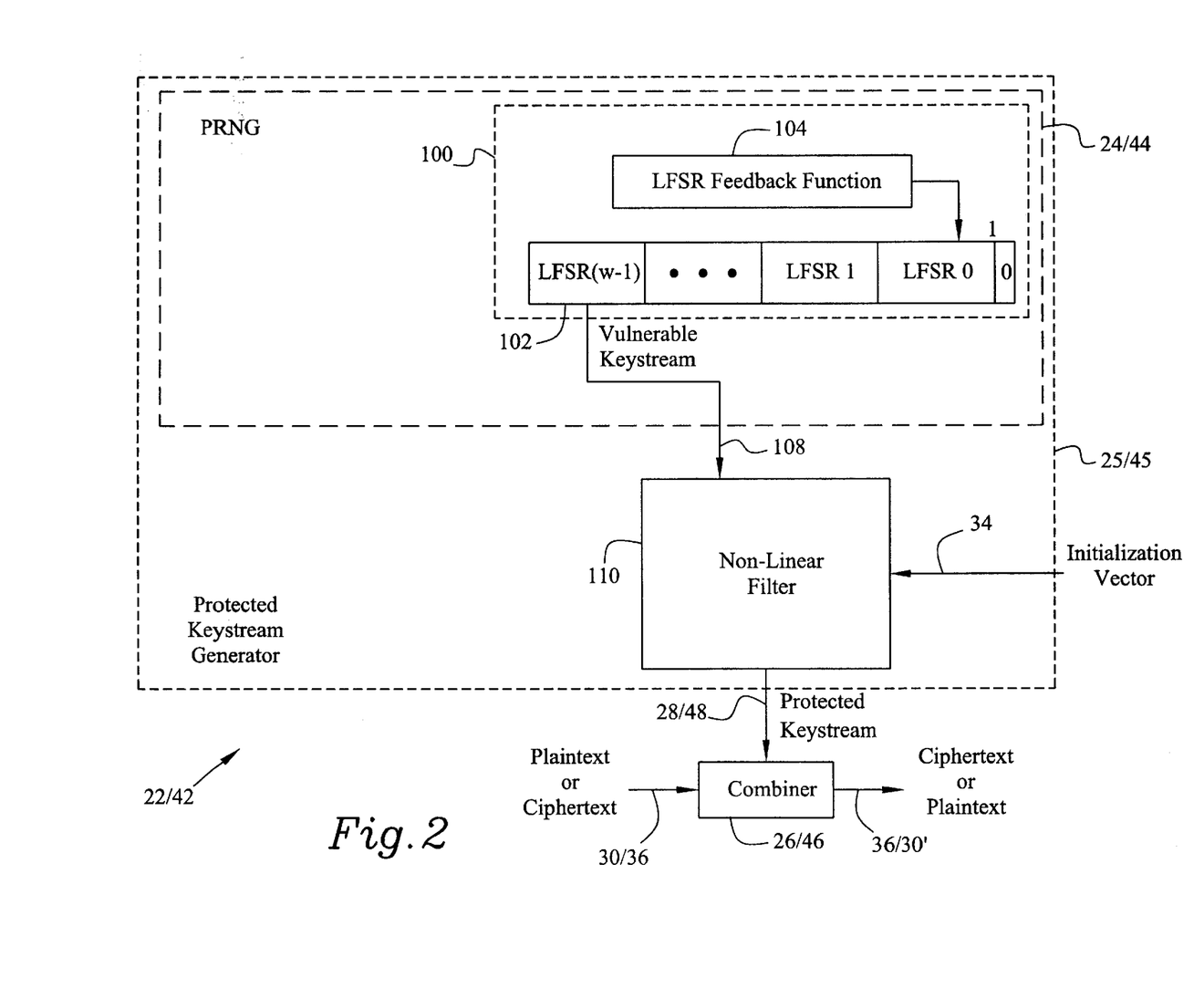
FIG. 2 is a block diagram of a sender or receiver of the cryptosystem of FIG. 1 wherein a pseudo-random bit generator is illustrated in greater detail.

The sender 22 or receiver 42 of cryptosystem 20 of FIG. 1 is illustrated generally in block diagram form in FIG. 2 wherein the protected keystream generator 25/45 and PRNG 24/44 are illustrated in greater detail. PRNG 24/44 of this embodiment includes a linear feedback shift register (LFSR) 100. LFSR 100 includes N storage elements 102 and a linear feedback function 104 that expresses each new element a(t) of the sequence, in terms of the previous generated elements a(t−N), a(t−N+1), ..., a(t−1). LFSR storage elements 102 are referred to as stages and binary signals a(0), a(1), a(2), ..., a(N−1) are loaded into the stages as initial data to generate a keystream sequence.

LFSR storage elements 102 are divided into w LFSR words of word length M represented as LFSR 0, LFSR 1, ..., LFSR (w−1). LFSR 0 includes a 0 bit in its least significant bit (LSB), because LFSR 100 must have a feedback polynomial f(x) represented by linear feedback function 104 which is primitive and irreducible to provide good statistics. Therefore, the number of storage elements N must not be a multiple of 8. Suitable example sizes for N and w, where each word length M is 32 bits, are: N=127 and w=4; and N=159, w=5.

Post-processing of the output of LFSR 100 provides security against certain types of attacks by cryptanalysts. In the embodiment illustrated in FIG. 2, the output from LFSR 100 is provided from the most significant word LFSR (w−1) and is referred to as a vulnerable keystream 108. In other embodiments, the vulnerable keystream 108 is obtained from a selected one of the other LFSR words (i.e., LFSR 0, LFSR 1, . . . , LFSR(w−2) depending on the characteristics of the particular LFSR 100.

The vulnerable keystream 108 is provided to a non-linear filter 110 having a state and functioning as a cryptographic isolator to further isolate protected keystream 28/48 from the vulnerable keystream 108. The state of non-linear filter 110 is initialized with initialization vector 34. The non-linear filter 10 performs a non-linear one-way function on the vulnerable keystream 108 to provide keystream 28/48 with enhanced security to cryptographic combiner 26/46. For example, the one-way function provided by non-linear filter 110 prevents plaintext attacks by cryptanalysts. Plaintext attacks by cryptanalysts are performed by knowing or guessing certain plaintext and observing the associated ciphertext to yield information about the keystream and then working backwards to determine the key of secrecy of the LFSR (i.e., the initial state of the LFSR and the feedback function of the LFSR). Since the LFSR is linear, it is possible to ascertain the initial state and the linear feedback function if sufficient plaintext is known by the cryptanalyst. Non-linear filter 110 is a one-way function, which makes it computationally very expensive to try to go backwards or preferably makes it impossible to go backwards to determine its inputs based on its output.

Figure 3:
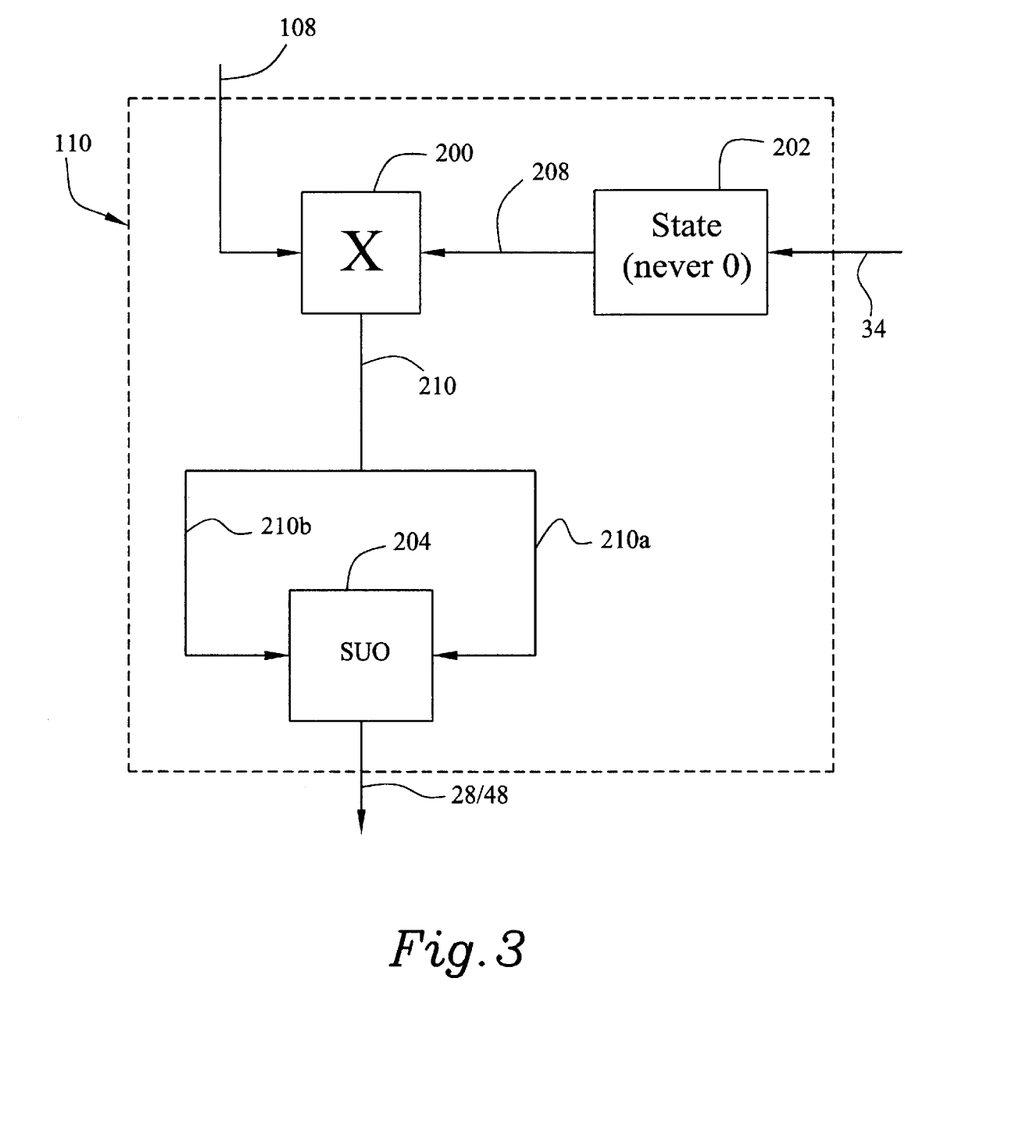
FIG. 3 is a block diagram of a non-linear filter cryptographic isolator employing a multiplication operation according to the present invention for use in the pseudo-random bit generator of FIG. 2.

One embodiment of a non-linear filter cryptographic isolator 110 according to the present invention is illustrated generally in block diagram form in FIG. 3. Non-linear filter cryptographic isolator 110 according to the present invention includes a multiplication operation in its one-way function. Non-linear filter cryptographic isolator 110 includes a multiplier 200, a state function 202, and a simple unbiased operation (SUO) 204. The vulnerable keystream 108 is provided as one input to multiplier 200 and may also be provided as an input to state function 202.

State function 202 is initialized with initialization vector 34 and provides a state value on a line 208. In one embodiment, state function 202 performs a one's complement addition operation on the previous state value and the vulnerable keystream 108 value to provide the state value on line 208. In this embodiment, initialization vector 34 provides the initial state value. In any case, state function 202 must assure that one of its two operands (i.e., the previous state value and the vulnerable keystream 108 value) is non-zero to assure that the next state value on line 208 is always non-zero. If state function 202 is a one's complement addition operation, the state value on line 208 will never produce a zero as long as one of the inputs is non-zero. Thus, initialization vector 34 initializes the state value to a non-zero value, and once the state value is non-zero the state value remains non-zero with the one's complement addition operation.

Multiplier 200 performs a binary multiplication operation on the vulnerable keystream 108 value and the state value provided on line 208 to provide a partial product array on line 210. The partial product array on line 210 is separated into a lower half partial product array 210a and an upper half partial product array 210b which are both provided to SUO 204. SUO 204 combines the lower half partial product array 210a with the upper half partial product array 210b, such as with one of the commonly available unbiased dyadic operations to provide the protected keystream 28/48. A dyadic operation is herein defined as an operation performing a function on exactly two inputs. Commonly available unbiased dyadic operations include, but are not limited to, addition, subtraction, XOR, and XNOR. One's complement or two's complement addition and subtraction can be used for SUO 204. If the SUO 204 is a subtraction operation, the lower half partial product array 210a can be subtracted from upper half partial product array 210b or upper half partial product array 210b can be subtracted from lower half partial product array 210a. In one embodiment, SUO 204 is implemented in a look-up table.

In one embodiment, instead of multiplying the selected vulnerable keystream 108 value with the state value on line 208, the vulnerable keystream 108 value is separated into two halves and the two halves are multiplied together. In another embodiment, some function is performed on the previous partial product array on line 210 by state function 202 which provides this modified partial product value as the state value on line 208 to be multiplied by the vulnerable keystream 108 value.

In one embodiment, state function 202 receives plaintext 30 and performs a function on plaintext 30 to provide the state value on line 208. In another embodiment, state function 202 receives ciphertext 36 and performs a function on ciphertext 36 to provide the state value on line 208. In one embodiment state function 202 is a combination of at least two subordinate state functions.

The combination of multiply and SUO produces only a small bias except for one output value which can be up to three times more frequent than the mean output frequency. This value is produced whenever one of the multiplication inputs is zero. The amount of bias and the value produced depends on the SUO, e.g., exclusive-or produces a zero value while the exclusive-nor produces bit vector of all one's. In one embodiment, the non-linear filter cryptographic isolator 110 tests the keystream for an output that is more likely to occur, and when found, the non-linear filter cryptographic isolator 110 replaces the output that is more likely to occur with an unbiased value produced by an unbiased function of a source of suitably distributed data. In one embodiment, the source of suitably distributed data is the vulnerable keystream. In one embodiment, non-linear filter cryptographic isolator 110 combines the biased protected keystream with other random data to produce an unbiased protected keystream. In one embodiment, non-linear filter cryptographic isolator 110 combines the biased protected keystream with data from the vulnerable keystream. In another embodiment, the SUO subtracts the upper partial product array from the lower partial product array and if a borrow is generated by that operation, the result is incremented by one. This is equivalent to multiplying modulo $2^N+1$. Of the methods for removing bias, the modulo $2^N+1$ method is the least desirable because it leaves a significant residual bias. In another embodiment, the PRNG input to the multiplier is guaranteed to not be zero (e.g., if the PRNG comprises a LFSR which is not larger than the word size to be multiplied or is a one's complement sum of such an LFSR with some other pseudo-random data) and the state input is also never zero due to being a one's complement sum. In yet another embodiment, both inputs to the multiply are non-zero initialized one's complement running sums.

In an alternative embodiment, non-linear filter cryptographic isolator 110 provides further cryptographic isolation by selecting between various SUOs after each multiply. In one embodiment, the selection is pseudo-random. In one embodiment, the selection is deterministic.

The SUO 204 must combine lower half partial product array 210a and upper half partial product array 210b with a dyadic operation which makes the combination of the multiplication operation of multiplier 200 and the selected SUO of SUO 204 not invertible (i.e., a one-way function).

Figure 4A:
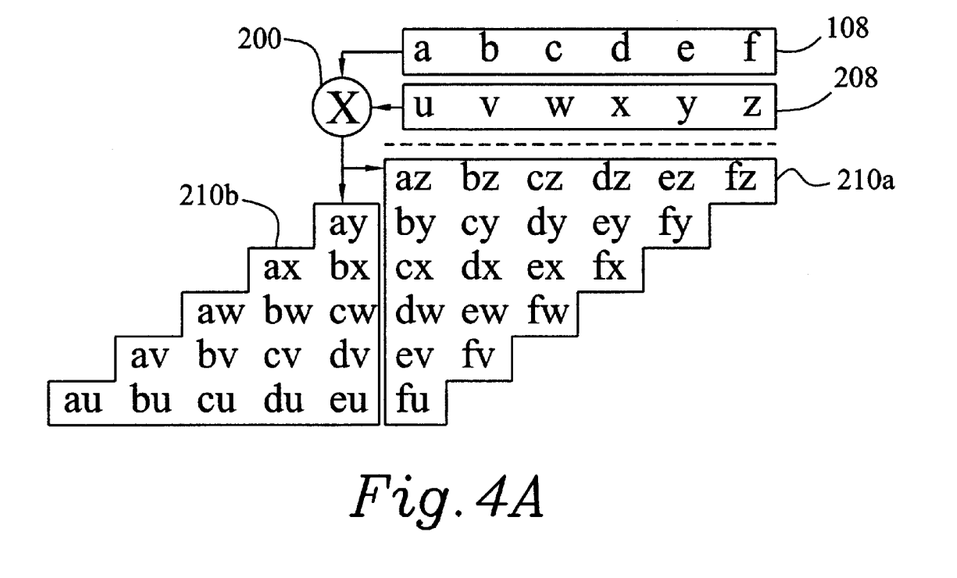
FIGS. 4A and 4B are diagrams illustrating an example multiplier operation, and corresponding SUO according to the present invention for the non-linear filter cryptographic isolator of FIG. 3.
Figure 4B:
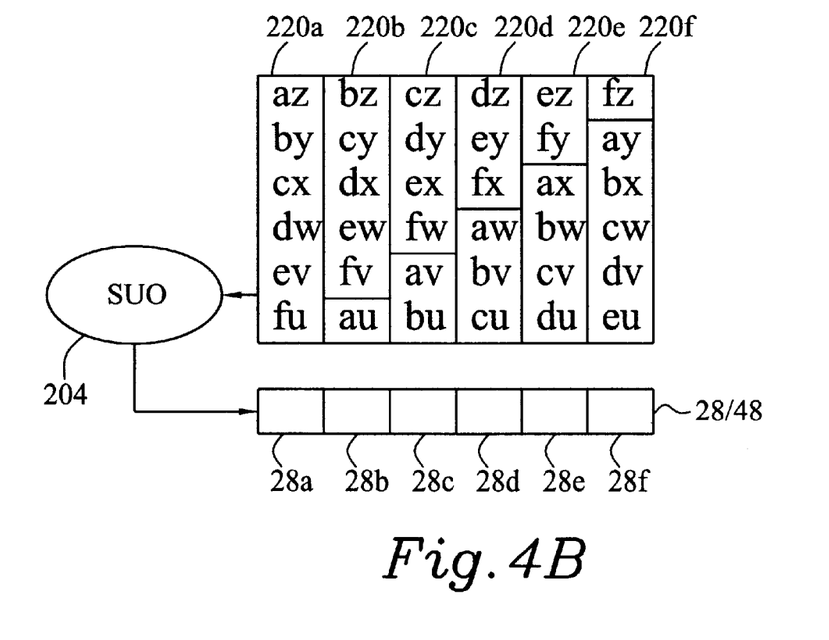

FIGS. 4A and 4B together illustrate an example multiplier 200 operation and SUO 204 where an example selected six-bit LFSR word in vulnerable keystream 108 having bits "abcdef" and state value 208 having bits "uvwxyz" are multiplied together to obtain lower half partial product array 210a and upper half partial product array 210b. Each of the two-bit combinations in the partial product array 210 represent the logical AND of one bit of the selected LFSR word in vulnerable keystream 108 and one corresponding bit of the state value 208. This is the normal behavior of unsigned multiply.

Referring to FIG. 4B, the upper half partial product array 210b is shifted underneath the lower half partial product array 210a to form six corresponding columns, indicated at 220a, 220b, 220c, 220d, 220e, and 220f. This depicts the composition of the value naturally produced by the SUO. As illustrated in FIG. 4B, each column 220 includes every input bit from the selected LFSR word in vulnerable keystream 108 and the state value 208, but each bit only appears once in each column 220. SUO 204 combines each column 220a–f to form corresponding output bits 28a, 28b, 28c, 28d, 28e, and 28f of protected keystream 28. Since, each input bit appears once in each column 220, each output bit 28a-f of protected keystream 28 is a function of every input bit. Ignoring carry or borrow, each bit has a 50 percent chance of affecting each output bit (i.e., a 50 percent chance that the bit is paired with a one). Thus, before carry and borrow operations further obscure the protected keystream output 28, each output bit 28a–f is produced with a one-way function having the desired cryptographic property referred to as perfect non-linearity. Perfect non-linearity means that a non-linear boolean function's output has a 50 percent chance of changing if any input bit changes.

The combination of the multiplication operation of multiplier 200, the state function/value, and the SUO of 204 obtains length preservation (the number of output bits is the same number as the input bits) for embodiments where the state function input is either the vulnerable keystream 108 or the protected keystream 28. The non-linear filter cryptographic isolator 110 using multiplication also obtains full diffusion because each output bit of protected keystream 28 is a function of every input bit of the multiplication operands from vulnerable keystream 108 and the state value 208. Furthermore, there is little bias added by multiplier 200 and SUO 204 when any of the preferred bias suppression methods are used.

None of the conventional very complex and slow one-way functions for cryptographic isolators obtain full diffusion in just two operations as is accomplished with the non-linear filter cryptographic isolator 110 using multiplication and the SUO according to the present invention. Moreover, modern microprocessors include high-speed multipliers which make non-linear filter cryptographic isolator 110 with the multiplication operation and SUO significantly faster than conventional one-way functions for cryptographic isolators. Furthermore, the multiplication one-way function according to the present invention for non-linear filter cryptographic isolator 110 achieves length preservation, adds little bias to the keystream output, and achieves full diffusion.

As to the above described embodiments of the cryptosystems according to the present invention, the preferred of the various embodiments depends on the characteristics of the particular cryptosystem in which it is used, the non-linear filter cryptographic isolator characteristics desired by the cryptosystem designer, the resources the designer has at hand, and the price the designer is willing to pay for each characteristic.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A stream cipher cryptosystem comprising:
    a pseudo-random number generator (PRNG) receiving a key and providing a vulnerable keystream; and
    a non-linear filter cryptographic isolator converting the vulnerable keystream into a protected keystream, the non-linear filter cryptographic isolator including:
        a multiplier for performing a multiplication function on the vulnerable keystream to provide a partial product array having a lower partial product array and an upper partial product array; and
        a simple unbiased operation (SUO) for combining the lower partial product array and the upper partial product array to provide the protected keystream wherein the combination of the multiplication function and the SUO is a one-way function.

2. The stream cipher cryptosystem of claim 1 further comprising:
    a cryptographic combiner for combining a first binary data sequence and the protected keystream to provide a second binary data sequence.

3. The stream cipher cryptosystem of claim 2 wherein the cryptographic combiner is an encryption combiner and the first binary data sequence is a plaintext binary data sequence and the second binary data sequence is a ciphertext binary data sequence.

4. The stream cipher cryptosystem of claim 2 wherein the cryptographic combiner is a decryption combiner and the first binary data sequence is a ciphertext binary data sequence and the second binary data sequence is a plaintext binary data sequence.

5. The stream cipher cryptosystem of claim 1 wherein the PRNG includes:
    a linear feedback shift register (LFSR) responsive the key for providing the vulnerable keystream.

6. The stream cipher cryptosystem of claim 1 wherein the non-linear filter cryptographic isolator further includes:

a state function for providing a state value to the multiplier which multiplies the vulnerable keystream and the state value to provide the partial product array.

7. The stream cipher cryptosystem of claim 1 wherein the non-linear filter cryptographic isolator includes:
a multiplicity of state functions and corresponding state values.

8. The stream cipher cryptosystem of claim 7 wherein each input to the multiply is a state variable initialized to non-zero value and updated by one's complement addition.

9. The stream cipher cryptosystem of claim 1 wherein the SUO is a dyadic operation which combines same sized inputs into an output that is the same size as the inputs without adding bias.

10. The stream cipher cryptosystem of claim 1 wherein the SUO is performed with a look-up table.

11. The stream cipher cryptosystem of claim 4 wherein the non-linear filter cryptographic isolator selects the SUO from a group of SUOs after each multiply.

12. The stream cipher cryptosystem of claim 11 wherein the non-linear filter cryptographic isolator pseudo-randomly selects the SUO from the group of SUOs.

13. The stream cipher cryptosystem of claim 11 wherein the non-linear filter cryptographic isolator deterministically selects the SUO from the group of SUOs.

14. The stream cipher cryptosystem of claim 1 wherein the non-linear filter cryptographic isolator tests the keystream for an output that is more likely to occur than the average frequency, and if found, the non-linear filter cryptographic isolator replaces the output that is more likely to occur with an unbiased function of a source of suitably distributed data.

15. The stream cipher cryptosystem of claim 14 wherein the source of suitably distributed data is the vulnerable keystream.

16. The stream cipher cryptosystem of claim 14 wherein the non-linear filter cryptographic isolator combines the biased protected keystream with other random data to produce an unbiased protected keystream.

17. The stream cipher cryptosystem of claim 16 wherein the non-linear filter cryptographic isolator combines the biased protected keystream with data from the vulnerable keystream.

18. The stream cipher cryptosystem of claim 6 wherein the state function receives the vulnerable keystream and combines the previous state value with the vulnerable keystream to provide the next state value.

19. The stream cipher cryptosystem of claim 18 wherein the state function combines the previous state value with the vulnerable keystream with a one's complement operation.

20. The stream cipher cryptosystem of claim 19 wherein an initialization vector is provided to the state function to initialize the state value to a non-zero value.

21. The stream cipher cryptosystem of claim 6 wherein the state function receives the partial product array and performs a function on the partial product array to provide the state value.

22. The stream cipher cryptosystem of claim 6 wherein the state function receives plaintext and performs a function on the plaintext to provide the state value.

23. The stream cipher cryptosystem of claim 22 wherein the state function receives ciphertext and performs a function on the ciphertext to provide the state value.

24. The stream cipher cryptosystem of claim 6 wherein the state function is a combination of at least two subordinate state functions.

25. The stream cipher cryptosystem of claim 1 wherein the non-linear filter cryptographic isolator divides the vulnerable keystream into a first portion and a second portion and wherein the multiplication function includes multiplying the first portion and the second portion.

26. A method of encrypting a plaintext binary data sequence, the method comprising the steps of:
generating a pseudo-random number vulnerable keystream as a function of a key;
converting the vulnerable keystream into a protected keystream by performing a multiplication function on the vulnerable keystream to provide a partial product array having a lower partial product array and an upper partial product array;
combining the lower partial product array and the upper partial product array with a simple unbiased operation SUO to provide the protected keystream, wherein the combination of the multiplication function and the SUO is a one-way function; and
combining the plaintext binary data sequence and the protected keystream to provide a ciphertext binary data sequence.

27. The method of claim 26 wherein performing the converting step includes the steps of:
providing a state value and multiplying the vulnerable keystream and the state value to provide the partial product array.

28. The method of claim 26 wherein the SUO is performed with a dyadic operation which combines same sized inputs into an output that is the same size as the inputs without adding bias.

29. The method of claim 26 wherein the SUO is performed with a look-up table.

30. The method of claim 26 wherein performing the converting step further includes the step of:
selecting the SUO from a group of SUOs after each multiply.

31. The method of claim 30 wherein the selecting step includes pseudo-randomly selecting the SUO.

32. The method of claim 30 wherein the selecting step includes deterministically selecting the SUO.

33. The method of claim 26 wherein performing the converting step further includes the steps of:
testing the protected keystream for an output that is more likely to occur than average frequency because of the SUO performed on the lower and upper partial product arrays; and
if the output that is more likely to occur than average frequency is found in the testing step, replacing the output that is more likely to occur with an unbiased function of the vulnerable keystream.

34. The method of claim 27 wherein the providing the state value step includes the steps of:
receiving the vulnerable keystream; and
combining the previous state value with the vulnerable keystream to provide the next state value.

35. The method of claim 34 wherein the combining step combines the previous state value with the vulnerable keystream with a one's complement operation.

36. The method of claim 35 wherein the providing the state value step further includes the step of:
initializing the state value to a non-zero value.

37. The method of claim 27 wherein the providing the state value step includes the steps of:
receiving the partial product array; and
performing a function on the partial product array to provide the state value.

38. The method of claim 26 wherein performing the converting step includes the steps of:
dividing the vulnerable keystream into a first portion and a second portion; and
multiplying the first portion and the second portion.

39. A method of decrypting a ciphertext binary data sequence, the method comprising the steps of:
generating a pseudo-random number vulnerable keystream as a function of a key;
converting the vulnerable keystream into a protected keystream by performing a multiplication function on the vulnerable keystream to provide a partial product array having a lower partial product array and an upper partial product array;
combining the lower partial product array and the upper partial product array with a simple unbiased operation SUO to provide the protected keystream wherein the combination of the multiplication function and the SUO is a one-way function; and
combining the ciphertext binary data sequence and the protected keystream to provide a plaintext binary data sequence.

40. The method of claim 39 wherein performing the converting step includes the steps of:
providing a state value and multiplying the vulnerable keystream and the state value to provide the partial product array.

41. The method of claim 39 wherein the SUO is performed with a dyadic operation which combines same sized inputs into an output that is the same size as the inputs without adding bias.

42. The method of claim 39 wherein the SUO is performed with a look-up table.

43. The method of claim 39 wherein performing the converting step further includes the step of:
selecting the SUO from a group of SUOs after each multiply.

44. The method of claim 43 wherein the selecting step includes pseudo-randomly selecting the SUO.

45. The method of claim 43 wherein the selecting step includes deterministically selecting the SUO.

46. The method of claim 39 wherein performing the converting step further includes the steps of:
testing the protected keystream for an output that is more likely to occur than average frequency because of the SUO performed on the lower and upper partial product arrays; and
if the output that is more likely to occur than average frequency is found in the testing step, replacing the output that is more likely to occur with an unbiased function of the vulnerable keystream.

47. The method of 40 wherein the providing the state value step includes the steps of:
receiving the vulnerable keystream; and
combining the previous state value with the vulnerable keystream to provide the next state value.

48. The method of claim 47 wherein the combining step combines the previous state value with the vulnerable keystream with a one's complement operation.

49. The method of claim 48 wherein the providing the state value step further includes the step of:
initializing the state value to a non-zero value.

50. The method of claim 40 wherein the providing the state value step includes the steps of:
receiving the partial product array; and
performing a function on the partial product array to provide the state value.

51. The method of claim 39 wherein performing the converting step includes the steps of:
dividing the vulnerable keystream into a first portion and a second portion; and
multiplying the first portion and the second portion.

52. The stream cipher cryptosystem of claim 1 wherein the vunerable keystream includes a plurality of input words, each having a plurality of input bits, wherein the protected keystream includes a plurality of output words, each having a plurality of output bits, wherein each output word of the protected keystream corresponds with one input word of the vunerable keystream, and wherein each output bit of the output word is a function of every input bit of the corresponding input word.

* * * * *